United States Patent [19]

Kawamoto et al.

[11] Patent Number: 4,978,740
[45] Date of Patent: Dec. 18, 1990

[54] COPOLYESTER AND POLYESTER FILM HAVING SAID COPOLYESTER AS SUBBING LAYER

[75] Inventors: Hitoshi Kawamoto; Yoshimichi Ozawa; Hiroshi Naito, all of Hohfu; Yoshihiro Wada, Tokyo; Toshiaki Yamazaki, Tokyo; Ichiya Harada, Tokyo, all of Japan

[73] Assignees: Kanebo, Ltd.; Konica Corporation, both of Tokyo, Japan

[21] Appl. No.: 456,304

[22] Filed: Dec. 26, 1989

[30] Foreign Application Priority Data

Dec. 28, 1988 [JP] Japan .................................. 63-332086

[51] Int. Cl.$^5$ ............................................. C08G 63/02
[52] U.S. Cl. ..................................... 528/272; 528/275; 528/294; 528/295; 528/298; 528/302; 528/305; 528/307; 528/308.6; 528/390; 528/391; 524/605; 525/444
[58] Field of Search ............... 528/272, 275, 294, 295, 528/298, 302, 305, 307, 308.6, 390, 391; 524/605; 525/444

[56] References Cited

U.S. PATENT DOCUMENTS 4,478,907 10/1984 Van Gossum et al. ............. 428/327
4,605,591 8/1986 Nose et al. .......................... 428/332

Primary Examiner—John Kight, III
Assistant Examiner—S. A. Acquah
Attorney, Agent, or Firm—Frishauf, Holtz, Goodman & Woodward

[57] ABSTRACT

There is disclosed a copolyester which comprises at least four compositions of: (A) terephthalic acid, and/or its ester forming derivative (terephthalic acid component) and isophthalic acid and/or its ester forming derivative (isophthalic acid component) with a molar ratio of 30/70 to 70/30; (b) 5 to 15 mole % of a dicarboxylic acid having sulfonate group and/or its ester forming derivative based on the all dicarboxylic acid components; (C) an alicyclic dicarboxylic acid and/or its ester forming derivative; and (D) 50 mole % of ethylene glycol based on the all glycol components; and a polyester film which comprises a subbing layer containing the copolyester provided on at least one side of a polyester film base.

22 Claims, No Drawings

COPOLYESTER AND POLYESTER FILM HAVING SAID COPOLYESTER AS SUBBING LAYER

BACKGROUND OF THE INVENTION

This invention relates to a water-soluble copolyester which is excellent in adhesion to a polyester film base and a hydrophilic colloid, particularly gelatin, and also improved in problems of working environment during use, and a polyester film having said copolyester as a subbing layer.

Polyester film, particularly biaxially oriented polyethylene terephthalate film has been used as base for photographic film, base for drawing, magnetic recording tape for its transparency, dimensional stability, and excellent mechanical properties, etc. In these uses, adhesion between the polyester film base and a surface layer material has been improved generally by providing a subbing layer therebetween. On the other hand, in the prior art, for improvement between a linear polyester and a metal foil, various plastics, particularly a hydrophilic resin such as gelatin, etc., it has been proposed to use a water-soluble or water-dispersible copolyester as the subbing layer for the problems in working environment and such advantage that no explosion preventive installation is required. As such an example, Japanese Patent Publication No. 40873/1972 discloses a copolymer using 8 mole % or more of an ester forming compound having metal sulfonate group based on all the acid components and 20 mole % or more of a polyethylene glycol based on all the glycol components for the purpose of dispersing water, but use of these as the subbing layer can be readily estimated to lower water resistance of said subbing layer, namely water resistance of adhesion. Also, in Japanese Patent Publication No. 5476/1981, a saturated linear aliphatic dicarboxylic acid with 4 to 8 methylene groups is used for the purpose of improving adhesion, but also in this case, water resistance of the subbing layer cannot be said to be satisfactory. Further, in Japanese Unexamined Patent Publication No. 88454/1981, description is made about use of a substantially water-insoluble aqueous dispersion for improvement of water resistance, but since this contains a water-soluble organic solvent in the dispersion, there remains the problems in working environment, etc. Japanese Unexamined Patent Publication No. 248231/1985 is almost similar to the above-mentioned Japanese Unexamined Patent Publicaton No. 88454/1981, but different therefrom primarily in that no organic solvent is contained in the final aqueous dispersion. However, since an organic solvent is used in the process of preparing an aqueous dispersion, in addition to the problems in working environment, the steps of preparing the aqueous dispersion become complicated and undesirable in practical application.

All of the subbing layers containing copolyesters as mentioned above can acquire adhesion to polyester film base with relative ease, but good adhesion to a hydrophilic colloid such as polyvinyl alcohol, gelatin, etc. could not be obtained because of poor water resistance.

SUMMARY OF THE INVENTION

A first object of the present invention is to provide a water-soluble or water-dispersible copolyester which minimizes problems in working environment and can simplify installations.

A second object of the present invention is to provide a polyester film having a subbing layer which is excellent in coatability as an aqueous solution and adhesion to a polyester film base, and also to a hydrophilic colloid such as polyvinyl alcohol, gelatin, etc. and also its water resistance.

A third object of the present invention is to provide a photographic light-sensitive material having a silver halide emulsion layer on a polyester film having a subbing layer containing a water-soluble copolyester.

Still another object of the present invention is to provide a polyester film having a subbing layer which also exhibits good adhesion to a binder in a magnetic layer, etc.

The present inventors have investigated intensively in order to obtain a polyester film having a subbing layer endowed with both of the properties antagonistic to each other of water solubility and water resistance as mentioned above, and consequently found the present invention. More specifically, the above-mentioned objects can be accomplished by providing a copolyester, comprising at least following four components:

(A) terephthalic acid and/or its ester forming derivative (terephthalic acid component) and isophthalic acid and/or its ester forming derivative (isophthalic acid component) with a molar ratio of 30/70 to 70/30;

(B) 5 to 15 mole % of a dicarboxylic acid having sulfonate group and/or its ester forming derivative based on all the dicarboxylic acid components;

(C) an alicyclic dicarboxylic acid and/or its ester forming derivative; and (D) 50 mole % or more of ethylene glycol based on the all glycol components and a polyester film, comprising a subbing layer containing said copolyester provided on at least one surface thereof.

The terephthalic acid component and the isophthalic acid component to be used in the present invention are 30/70 to 70/30 in molar ratio with respect to coatability onto the polyester film base and solubility in water. Also, it is further preferred to contain 50 to 80 mole % of these terephthalic acid and isophthalic acid components based on all the dicarboxylic acid components.

As the dicarboxylic acid having sulfonate group and/or its ester forming derivative to be used in the present invention, those having alkali metal sulfonate group are particularly preferred, and there may be employed, for example, alkali metal salts of 4-sulfoisophthalic acid, 5-sulfoisophthalic acid, sulfoterephthalic acid, 4-sulfophthalic acid, 4-sulfonaphthalene-2,7-dicarboxylic acid, 5-[4-sulfophenoxy]isophthalic acid, etc. or their ester forming derivatives, particularly preferably 5-sulfoisophthalic acid monosodium salt or its ester forming derivative. These dicarboxylic acids having sulfonate group and/or their ester forming derivatives are contained within the range of 5 to 15 mole %, particularly preferably 6 to 10 mole %, based on all the dicarboxylic acid components, from the standpoint of water solubility and water resistance.

As the alicyclic dicarboxylic acid and/or its ester forming derivative, 1,4-cyclohexane dicarboxylic acid, 1,3-cyclohexane dicarboxylic acid, 1,2-cyclohexane dicarboxylic acid, 1,3-cyclopentane dicarboxylic acid, 4,4′-bicyclohexyl dicarboxylic acid, etc., or ester forming derivatives thereof may be employed, and these are preferably used at a ratio of 10 mole % or more based on all the dicarboxylic acid components from the standpoint of viscosity of an aqueous solution of the resin. If the amount is too small, the above-mentioned viscosity may be sometimes increased to pose a problem in coatability.

Also, in the present invention, as other dicarboxylic acid components than those as described above, aromatic dicarboxylic acids or ester forming derivatives thereof may be used within the range of 30 mole % or less of all the dicarboxylic acid components. As these dicarboxylic acid components, for example, aromatic dicarboxylic acids such as phthalic acid, 2,5-dimethylterephthalic acid, 2,6-naphthalene dicarboxylic acid, 1,4-naphthalene dicarboxylic acid, biphenyl dicarboxylic acid, etc. or ester forming derivatives of these may be employed. Also, linear aliphatic dicarboxylic acids or ester forming derivatives thereof may be used at a ratio of 15 mole % or less of all the dicarboxylic acid components. Examples of such dicarboxylic acid components may include aliphatic dicarboxylic acids such as adipic acid, pimelic acid, suberic acid, azelaic acid, sebacic acid, etc. or ester forming derivatives thereof. If the above-mentioned linear aliphatic dicarboxylic acid component is too much, not only blocking is liable to occur, but also adhesion will be inferior in water resistance.

In the present invention, from the standpoint of mechanical properties and adhesion to polyester film base of the copolyester, ethylene glycol is used at a ratio of 50 mole % or more based on all the glycol components. Also, as glycol components other than ethylene glycol, 1,4-butane diol, neopentyl glycol, 1,4-cyclohexane dimethanol, diethylene glycol, triethylene glycol, polyethylene glycol, etc. may be also used in combination.

As the preparation method of the copolyester in the present invention, various conventional methods can be utilized. For example, there may be included the method in which a transesterification reaction between the dimethyl ester of a dicarboxylic acid and a glycol is carried out, and after evaporation of methanol, the pressure is gradually reduced to carry out polycondensation under high vacuum, the method in which an esterfication reaction between a dicarboxylic acid and a glycol is carried out, and after evaporation of water which is formed, the pressure is gradually reduced to carry out polycondensation under high vacuum, or the method in which when using a dimethyl ester of a dicarboxylic acid and the dicarboxylic acid in combination as starting materials, a transesterification reaction between a dimethyl ester of the dicarboxylic and a glycol, and further the esterfication reaction with addition of the dicarboxylic acid are carried out, followed by polycondensation under high vacuum. As a transesterification catalyst, known catalysts such as manganese acetate, calcium acetate, zinc acetate, etc. can be used, while as a polycondensation catalyst, antimony trioxide, germanium oxide, dibutyltin oxide, titanium tetrabutoxide, etc. can be used. As the stabilizer, phosphorus compounds such as trimethyl phosphate, triphenyl phosphate, etc., hindered phenol type compounds such as Irganox 1010 (trade mark of Ciba Geigy AG pentaerythrityl tetrakis[3-(3,5-di-tert-4-hydroxyphenyl)propionate]-), etc. may be also used. However, the conditions such as polymerization methods, catalysts, stabilizers, etc. are not limited to the examples as described above.

The copolyester of the present invention has water solubility, but water solubility as mentioned in the present invention is not physicochemically strict, but is also inclusive of the cases of being dissolved and/or microscopically dispersed in water. The copolyester of the present invention preferably has an inherent viscosity of 0.3 dl/g or higher. If the inherent viscosity is too low, sufficient adhesion can be obtained with difficulty.

In the present invention, a polyester film is prepared by providing a subbing layer containing the copolyester as described above on at least one side of the film.

In the subbing coating solution containing the copolyester, further surfactants, antistatic agents, matting agents, and further water-soluble or water-dispersible polymers other than the copolyester of the present invention may be added within a range which does not damage the effect of the present invention.

In a polyester film of the present invention, as the polyester film base on which the above copolymer is provided, those comprising linear saturated polyesters synthesized from aromatic dibasic acids or ester forming derivatives thereof and diols or ester forming derivatives thereof are included. Specific examples of such polyesters include polyethylene terephthalate, polyethylene isophthalate, polybutylene terephthalate, etc., and further copolymers of these, and blends obtained by blending with small amounts of other resins may be included. Further, polyester film bases containing white pigments such as titanium dioxide, barium sulfate, etc. kneaded therein also may be employed.

The polyester film of the present invention should be preferably obtained by coating the copolyester of the present invention on at least one side of the above polyester film base before completion of crystal orientation and, after drying, stretching the coated product in at least one direction, followed by heat set to complete crystal orientation.

For coating of the subbing layer onto a polyester film base, a conventional coating step, namely the step of coating a subbing solution on the polyester film base biaxially stretched and heat set separately from the preparation step of said film base can be of course used, but such a process is disadvantageous in cost. On the contrary, the method of performing coating of a subbing layer in the preparation steps of the polyester film base is preferred. Particularly, it is preferred to coat at least one side of the polyester film base at any time before completion of crystal orientation in the steps as described above. As an example of a method, the non-oriented film obtained by cooling the polyester melt extruded into a film through a die on a cooling drum is preheated, then stretched in the machine direction, and thereafter a subbing coating solution is applied thereon, and after drying, further preheated and stretched in the transverse direction, followed by heat set. Also before coating of the subbing coating solution, a surface treatment such as corona discharging, glow discharging, etc. also may be performed.

In the present invention, the polyester film base before completion of crystal orientation refers to an non-oriented film which is formed by heat melting a polyester polymer as such into a film, or a uniaxially stretched film obtained by stretching such a non-oriented film in either one of the machine or transverse direction, and further a biaxially stretched film which is stretched biaxially in both the machine and transverse directions, but before completion of crystal orientation by re-stretching in either one of the machine or transverse direction, etc.

Generally the stretching ratios of the machine and transverse directions are 2.0 to 5.0.

The solid concentration in the above subbing coating solution may be generally 15% by weight or less, preferably 10% by weight or less. An amount coated may be preferably 1 to 20 g, more preferably 5 to 15 g in weight of coating solution per 1 m² of a film.

As the coating method, various known methods are applicable. For example, the roll coating method, the gravure roll method, the spray coating method, the air knife coating method, the bar coating method, the impregnation method, and the curtain coating method, etc. can be applied either alone or in combination.

The polyester film coated as described above before completion of crystal orientation is dried and led to the steps of stretching, heat set, etc. The polyester film having the subbing layer thus obtained exhibits good adhesion property and water resistance to hydrophilic colloid such as polyvinyl alcohol, gelatin, etc.

In the present invention, various films can be prepared by providing at least one hydrophilic colloid layer on the subbing layer of the polyester film having the subbing layer as described above. As an example by use of the polyester film of the present invention, a photographic light-sensitive material having at least one silver halide emulsion layer provided on or over said subbing layer may be mentioned. Also, it is possible to provide a layer containing a binder such as a magnetic layer, etc. instead of the hydrophilic colloid layer.

As the hydrophilic colloid to be used for the above-mentioned hydrophilic colloid layer, for example, there can be employed proteins such as gelatin, albumin, casein, etc.; cellulose derivatives such as hydroxyethyl cellulose, carboxymethyl cellulose, cellulose sulfates, etc.; saccharide derivatives such as sodium alginate, starch derivatives, etc.; various synthetic hydrophilic polymeric substances such as homo- or copolymers, including polyvinyl alcohol, polyvinyl alcohol partial acetal, poly-N-vinyl pyrrolidone, polyacrylic acid, polymethacrylic acid, polyacrylamide, polyvinyl imidazole, polyvinyl pyrazole, etc., but preferably gelatin is used. As the gelatin, in addition to lime-treated gelatin, acid-treated gelatin or oxygen-treated gelatin as described in Bulletin Society Science Photography Japan, No. 16, p. 30 (1966) may be also used. Also, hydrolysates or enzyme decomposed products of gelatin can be used, and further gelatin derivatives, and graft polymers of gelatin with gelatin and other polymers are included.

In the light-sensitive photographic material of the present invention, as the silver halide emulsion to be used in at least one layer of silver halide emulsion provided on or over the subbing layer as described above, conventional various silver halide emulsions can be used as desired. Said emulsion can be chemically sensitized in conventional manner, and also can be optically sensitized to a desired wavelength region by use of a spectral sensitizer. Also, in the silver halide emulsion, antifoggants, stabilizers, hardeners, etc. can be added. As the binder of said emulsion, the hydrophilic colloid as described above can be used, but gelatin may be advantageously employed.

Silver halide emulsion layer, and other hydrophilic colloid layers can enhance hardness by use of a hardener, and various hardeners such as aldehyde type, aziridine type, isoxazole type, epoxy type, vinylsulfone type, acryloyl type, carbodiimide type, triazine type, polymer type, and other maleimide type, acetylene type, methanesulfonate type can be used alone or in combination. Also, plasticizers, dispersions of water-insoluble or difficultly soluble synthetic polymers (latex), couplers, coating aids, antistatic agents, and further formalin scavenger, fluorescent brighteners, matting agents, lubricants, image stabilizers, surfactants, color anti-foggants, development accelerators, development retarders, bleaching accelerators, etc. also can be contained.

In the light-sensitive photographic material of the present invention, as the hydrophilic colloid layer other than the silver halide emulsion layers as described above, there are auxiliary layers such as protective layer, filter layer, back coating layer, antihalation layer, antiirradiation layer, intermediate layer, etc.

The present invention is applicable to various light-sensitive photographic materials such as light-sensitive X-ray materials, light-sensitive printing materials, light-sensitive materials for photographing, light-sensitive materials for viewing, etc.

In the present invention, the following advantages can be obtained.

(1) Since the copolyester of the present invention can be applied from as an aqueous solution, there is no problem in working environment such as toxicity and inflammability, and the installations can be simplified as compared with the organic solvent system.

(2) When the copolyester of the present invention is used as the subbing layer, particularly the adhesion between a polyester film base and hydrophilic colloid is excellent, exhibiting excellent water resistance.

(3) Since an alicyclic dicarboxylic acid is used for the copolyester, gelling of the aqueous solution can be avoided at a solid concentration of 15% by weight or lower, exhibiting good coatability, and also adhesion excellent in water resistance can be effected when used as the subbing layer as compared with the case when the aqueous solution viscosity is lowered with a linear aliphatic dicarboxylic acid.

(4) Since the coating solution containing the copolyester of the present invention exhibits an adequate viscosity as the aqueous solution, particularly excellent effect concerning coatability onto a polyester film base before completion of crystal orientation can be exhibited.

EXAMPLES

Further, the present invention is described below in more detail by referring to Examples.

The copolyesters and the subbing layers obtained were evaluated according to the following methods.

(1) Inherent viscosity: measured in a mixture of phenol/1,1,2,2-tetrachloroethane=60/40 (weight ratio) at 20° C.

(2) Water solubility: to 75 g of the copolyester was added 425 g of water, and the copolyester sufficiently swelled at a temperature slightly higher than its glass transition temperature, and then stirring conducted at 95° C. for 3 hours before evaluation.

(3) Aqueous solution viscosity: measured as 8% by weight aqueous solution at 20° C.

(4) Coatability: by use of 8% by weight of aqueous solution of a copolyester, it was coated to a predetermined coating thickness by a wire bar on a uniaxially stretched polyethylene terephthalate film base. The coating state described above was evaluated according to visual observation. The evaluation standards are shown below:

○: coatable uniformly without irregularity.

△: streaks, slight pinhole or repellent spots formed on the coated surface.

×: repellent spots formed on the whole surface, and no uniform coating possible.

(5) Adhesion to film base: non-oriented film (thickness: 1000 μm) obtained by quenching the polyethylene terephthalate melt extruded through a T die at 280° C. into a film on a cooling drum was preheated to 75° C. and stretched three times its original length in the machine direction, followed by corona discharging, and subbing coating solution was coated on the surface-treated film base surface, dried in a tenter, and after preheating, stretched three times its original length at 100° C. in the transverse direction, followed further by heat set at 220° C., to give a polyethylene terephthalate film with subbing layer of 0.3 g/m² dry coat weight.

On the subbing surface of the polyethylene terephthalate film was formed a torn edge with a razor at the angle of 45° against the surface plane, and Cellophane tape was pressure contacted and abruptly peeled off. The peeled area of the subbing layer was evaluated according to five ranks.

(6) Adhesion to gelatin: on the coating film obtained in (5), a gelatin layer containing a hardener is coated, dried and hardened, and thereafter the same torn edge as in (5) was formed, a self-adhesive tape was pressure contacted, abruptly peeled off, and the peeled area of the gelatin layer was evaluated according to 5 ranks.

(7) Water resistance of adhesion: the gelatin coated film obtained in (6) was dipped in an aqueous potassium hydroxide solution of pH 10.2 at 35° C. for 15 seconds, the surface was damaged with a pen tip, further the surface was strongly rubbed with a rubber for 10 seconds and the peeled area of the gelatin layer was evaluated according to 5 ranks.

The standards for evaluation of 5 ranks showing adhesion and water resistance of adhesion are as follows:
1: adhesive force is very weak, and completely peeled off.
2: 50% or more is peeled off.
3: about 10 to 50% is peeled off.
4: adhesive force is considerably strong, and only less than 10% is peeled off.
5: adhesive force is very strong, and not peeled off at all.

Evaluation by the rank 4 or higher may be regarded as practically satisfactory adhesion.

EXAMPLE 1

Transesterification reaction was carried out by use of 38.74 parts by weight of dimethyl terephthalate, 31.95 parts by weight of dimethyl isophthalate, 10.34 parts by weight of dimethyl 5-sulfoisophthalate sodium salt, 54.48 parts by weight of ethylene glycol, 0.073 part by weight of calcium acetate monohydrate and 0.024 part by weight of manganese acetate tetrahydrate under nitrogen gas stream at 170° to 220° C. while evaporating methanol, 0.05 part by weight of trimethyl phosphate, and 0.04 part by weight of antimony trioxide as the polycondensation catalyst and 17.17 parts by weight of 1,4-cyclohexane dicarboxylic acid were added, followed by esterification at a reaction temperature of 220° to 235° C. by evaporating substantially the theoretical amount of water. Then, further the pressure was reduced to 0.2 mmHg and temperature was elevated to 280° C. The polycondensation was carried at the same conditions for 2 hours.

The copolyester obtained was analyzed to find that the inherent viscosity was 0.45 dl/g. Said copolyester was stirred in hot water of 95° C. for 3 hours to form a 15% by weight aqueous solution. A 8% by weight aqueous solution of slightly turbid aqueous solution obtained by dilution with water was used as the subbing coating solution, and coated on a machinally stretched film base to obtain biaxially stretched polyethylene terephthalate film having a subbing layer of 0.3 g/m² in dry weight which was coated with a gelatin layer to form a gelatin coated film, which was evaluated for adhesion:, etc. The evaluation results are shown in Table 1.

EXAMPLES 2-4

Examples 2-4 were conducted in the same manner as in Example 1 except for changing the composition of the copolyester as shown in Table 1. The respective evaluation results are shown in Table 1.

COMPARATIVE EXAMPLES 1-5

Comparative Examples 1-5 were conducted in the same manner as in Example 1 except for changing the composition of the copolyester as shown in Table 1. The respective evaluation results are shown in Table 1.

TABLE 1

| | | Example 1 | Example 2 | Example 3 | Example 4 | Comp. example 1 | Comp. example 2 | Comp. example 3 | Comp. example 4 | Comp. example 5 |
|---|---|---|---|---|---|---|---|---|---|---|
| Copolymerization composition | Acid component (mol %) | | | | | | | | | |
| | Dimethyl terephthalate | 40 | 40 | 40 | 30 | 53 | 53 | 40 | 40 | 40 |
| | Dimethyl isophthalate | 33 | 33 | 33 | 23 | 40 | 40 | 33 | 36 | 20 |
| | Dimethyl 5-sulfoisophthalate Na salt | 7 | 7 | 7 | 7 | 7 | 7 | 7 | 4 | 20 |
| | 1,4-Cyclohexane dicarboxylic acid | 20 | 20 | 10 | 40 | — | — | — | 20 | 20 |
| | Adipic acid | — | — | 10 | — | — | — | 20 | — | — |
| | Glycol component (mol %) | | | | | | | | | |
| | Ethylene glycol | 100 | 65 | 100 | 100 | 100 | 65 | 60 | 100 | 100 |
| | Diethylene glycol | — | 35 | — | — | — | 35 | 40 | — | — |
| Evaluation results | Inherent viscosity (d/g) | 0.45 | 0.46 | 0.48 | 0.52 | 0.30 | 0.50 | 0.53 | 0.47 | 0.20 |
| | Water solubility | Good | Good | Good | Good | Good | Gel-like | Good | Insoluble | Good |

TABLE 1-continued

|  | Example 1 | Example 2 | Example 3 | Example 4 | Comp. example 1 | Comp. example 2 | Comp. example 3 | Comp. example 4 | Comp. example 5 |
|---|---|---|---|---|---|---|---|---|---|
| Aqueous solution viscosity (cP) | 5.1 | 1.9 | 4.7 | 3.1 | 113 | >1200 | 1.5 | — | 1.8 |
| Coatability | O | O | O | O | Δ | X | O | — | O |
| Adhesion to film base | 5 | 5 | 5 | 5 | 5 | — | 5 | — | 4 |
| Adhesion to gelatin | 5 | 5 | 5 | 4 | 1 | — | 5 | — | 4 |
| Water resistance of adhesion | 5 | 5 | 4 | 4 | 1 | — | 3 | — | 1 |

As is apparent from Table 1, in Comparative Example 1 using no 1,4-cyclohexane dicarboxylic acid, adhesion to gelatin and water resistance are lowered. Also, aqueous solution viscosity becomes higher resulting in worse workability. In Comparative Example 2, in which the molar ratio of ethylene glycol was reduced in addition to this, the aqueous solution became gel-like, whereby coatability was very bad and could not be evaluated. Comparative Example 3 using adipic acid in place of 1,4-cyclohexane dicarboxylic acid was insufficient in water resistance of adhesion. In Comparative Example 4, in which the content of dimethyl 5-sulfoisophthalate Na salt is lower value than the range of the present invention, the polymer became insoluble in water and could not be evaluated. Also, in Comparative Example 5, in which said content was a higher value than the range of the present invention, water resistance of adhesion was very inferior.

As contrasted to the Comparative examples as described above, Examples 1 to 4 using the copolyester of the present invention were found to be all satisfactory in all the characteristic evaluations.

EXAMPLE 5

On a biaxially stretched polyethylene terephthlate film having a subbing layer prepared in the same manner as in Example 1, a light-sensitive layer for X-ray film was coated in a conventional manner and dried. The film adhesion under dried state before developing of the X-ray film obtained (hereinafter called "adhesion before developing"), the wet adhesion during developing and the adhesion under dried state after developing (hereinafter called "dry adhesion") were evaluated according to the following methods to give the results shown in Table 2.

Adhesion evaluation methods (Adhesion before developing and dry adhesion)

On the side of the light-sensitive hydrophilic layer of a sample before developing or after completion of drying after developing was damaged in checkers reaching the film base at an angle of 45° against the film surface with a razor blade, and a self-adhesive tape was pressure contacted thereon and said tape was peeled off abruptly at an angle of about 45°. The area of the light-sensitive hydrophilic layer peeled off at this time together with the tape was compared with the area of the tape plastered, and evaluated according to the following 5 ranks.

| Evaluation | 5 | 4 | 3 | 2 | 1 |
|---|---|---|---|---|---|
| Peel-off area | None | 0–20% | 21–50% | 51–100% | 101% or more |

The evaluation rank of 4 or higher may be regarded to be strong adhesion which is satisfactory in practical application.

(Wet adhesion)

During developing, the surface of the light-sensitive hydrophilic layer was damaged in checkers reaching the film base with a pen tip, and then the surface of said layer is rubbed strongly with a rubber under the wet state for 10 seconds. The area of the light-sensitive hydrophilic layer peeled off was evaluated according to 5 ranks. The evaluation standards were the same as adhesion before developing and dry adhesion.

EXAMPLES 6-7

Examples 6 and 7 were conducted in the same manner as in Example 5 except for changing the subbing coating solutions as shown in Table 2. The results are shown in Table 2.

COMPARATIVE EXAMPLES 6-8

Comparative Examples 6-8 were conducted in the same manner as in Example 5 except for changing the subbing coating solutions as shown in Table 2. The results are shown in Table 2.

TABLE 2

| | Subbing coating solution | Adhesion before developing | Wet adhesion | Dry adhesion |
|---|---|---|---|---|
| Example 5 | the same as in Example 1 | 5 | 5 | 5 |
| Example 6 | the same as in Example 2 | 5 | 5 | 5 |
| Example 7 | the same as in Example 3 | 4 | 4 | 5 |
| Comparative example 6 | the same as in Comparative example 1 | 1 | 1 | 1 |
| Comparative example 7 | the same as in Comparative example 3 | 4 | 3 | 5 |
| Comparative example 8 | the same as in Comparative example 5 | 4 | 1 | 5 |

As is apparent from Table 2, the light-sensitive films for X-ray having a subbing layer containing the copolyester of the present invention are excellent in all of adhesion before developing, wet and dry adhesions, particularly wet adhesion, as compared with samples having a subbing layer comprising a copolyester outside the scope of the present invention.

This effect was not limited to light-sensitive layers for X-ray film, but could be also obtained similarly in various light-sensitive layers for photography (color emulsion, emulsion for printing light-sensitive material, etc.)

We claim:

1. A copolyester of dicarboxylic acids and at least one glycol, comprising at least the following four components
    (A) terephthalic acid and/or its ester forming derivative (terephthalic acid component) and isophthalic acid and/or its ester forming derivative (isophthalic acid component) in a molar ratio of 30/70 to 70/30;
    (B) 5 to 15 mole % of a dicarboxylic acid having a sulfonate group and/or its ester forming derivative based on all the dicarboxylic acid components;
    (C) 10% or more of an alicyclic dicarboxylic acid and/or its ester forming derivative based on all the dicarboxylic acid components; and
    (D) 50 mole % or more of ethylene glycol based on all the glycol components.

2. The copolyester according to claim 1, wherein said Component (A) is in an amount of 50 to 80 mole based on all the dicarboxylic acid components.

3. The copolyester according to claim 1, wherein said dicarboxylic acid having sulfonate group and/or its ester forming derivative are at least one compound selected from the group consisting of alkali metal salts of 4-sulfoisophthalic acid, 5-sulfoisophthalic acid, sulfoterephthalic acid, 4-sulfophthalic acid, 4-sulfonaphthalene-2,7-dicarboxylic acid, 5-[4-sulfophenoxy]isophthalic acid and ester forming derivatives of the above compounds.

4. The copolyester according to claim 1, wherein the amount of said dicarboxylic acids having sulfonate group and/or their ester forming derivatives is 6 to 10 mole % based on all the dicarboxylic acid components.

5. The copolyester according to claim 1, wherein said alicyclic dicarboxylic acid and/or its ester forming derivative are at least one compound selected from the group consisting of 1,4-cyclohexane dicarboxylic acid, 1,3-cyclohexane dicarboxylic acid, 1,2-cyclohexane dicarboxylic acid, 1,3-cyclopentane dicarboxylic acid, 4,4,'-bicyclohexyl dicarboxylic acid and ester forming derivatives of the above compounds.

6. The copolyester according to claim 1, wherein when said Component (D) contains at least one glycol component other than ethylene glycol, said glycol component is at least one compound selected from the group consisting of 1,4-butane diol, neopentyl glycol, 1,4-cyclohexane dimethanol, diethylene glycol, triethylene glycol and polyethylene glycol.

7. The copolyester according to claim 1, wherein said copolyester has an inherent viscosity of 0.3 dl/g or higher.

8. A polyester film, comprising a subbing layer containing a copolyester according to claim 1 provided on at least one side of a polyester film base.

9. A polyester film comprising a polyester film obtained by coating a copolyester according to claim 1 on at least one side of a polyester film base before completion of crystal orientation and, after drying, stretching the coated product in at least one direction, followed by heat set to complete crystal orientation.

10. A polyester film, comprising a subbing layer containing a copolyester according to claim 1 on at least one side of a polyester film base, and further having at least one hydrophilic colloid layer on said subbing layer.

11. The polyester film according to claim 10, wherein the hydrophilic colloid layer contains gelatin.

12. A light-sensitive photographic material, having a subbing layer containing a copolyester according to claim 1 on at least one side of a polyester film base, and further having at least one layer of a silver halide emulsion layer on or over said subbing layer.

13. The polyester according to claim 1, wherein said Component (A) is in an amount of 50 to 80 mole % based on all the dicarboxylic acid components, and said copolyester has an inherent viscosity of 0.3 dl/g or higher.

14. The polyester according to claim 13, wherein
    said dicarboxylic acid having sulfonate group and/or its ester forming derivatives are at least one compound selected from the group consisting of alkali metal salts of 4-sulfoisophthalic acid, 5-sulfoisophthalic acid, sulfoterephthalic acid, 4-sulfophthalic acid, 4-sulfonaphthalene-2,7-dicarboxylic acid, 5-[4-sulfophenoxy]isophthalic acid and ester forming derivatives of the above compounds;
    the amount of said dicarboxylic acids having sulfonate group and/or their ester forming derivatives is 6 to 10 mole % based on all the dicarboxylic acid components;
    said alicyclic dicarboxylic acid and/or its ester forming derivative are at least one compound selected from the group consisting of 1,4-cyclohexane dicarboxylic acid, 1,3-cyclohexane dicarboxylic acid, 1,2-cyclohexane dicarboxylic acid, 1,3-cyclopentane dicarboxylic acid, 4,4,'-bicyclohexyl dicarboxylic acid and ester forming derivatives of the above compounds; and
    when said Component (D) contains at least one glycol component other than ethylene glycol, said glycol component is at least one compound selected from the group consisting of 1,4-butane diol, neopentyl glycol, 1,4-cyclohexane dimethanol, diethylene glycol, triethylene glycol and polyethylene glycol.

15. A polyester according to claim 14, wherein said Component (D) consists essentially of ethylene glycol or ethylene glycol and diethylene glycol.

16. A polyester according to claim 15, wherein said copolyester consists essentially of dimethyl terephthalate, dimethyl isophthalate, dimethyl 5-sulfoisophthalate Na salt, 1,4-cyclohexane dicarboxylic acid and ethylene glycol.

17. A polyester according to claim 16, wherein said copolyester consists essentially of dimethyl terephthalate, dimethyl isophthalate, dimethyl 5-sulfoisophthalate Na salt, 1,4-cyclohexane dicarboxylic acid, ethylene glycol and optionally at least one of adipic acid and diethylene glycol.

18. A polyester film, comprising a subbing layer containing a copolyester according to claim 14 on at least one side of a polyester film base, and further having at least one hydrophilic colloid layer on said subbing layer.

19. A polyester film, comprising a subbing layer containing a copolyester according to claim 15 on at least one side of a polyester film base, and further having at least one hydrophilic colloid layer which contains gelatin on said subbing layer.

20. A light-sensitive photographic material, having a subbing layer containing a copolyester according to claim 16 on at least one side of a polyester film base, and further having at least one layer of a silver halide emulsion layer on or over said subbing layer.

21. A light-sensitive photographic material, having a subbing layer containing a copolyester according to claim 17 on at least one side of a polyester film base, and further having at least one layer of a silver halide emulsion layer on or over said subbing layer.

22. A light-sensitive photographic material, having a subbing layer containing a copolyester according to claim 18 on at least one side of a polyester film base, and further having at least one layer of a silver halide emulsion layer on or over said subbing layer.

* * * * *